Oct. 13, 1931.  S. G. WINGQUIST  1,826,914
PACKING DEVICE
Filed Jan. 24, 1924
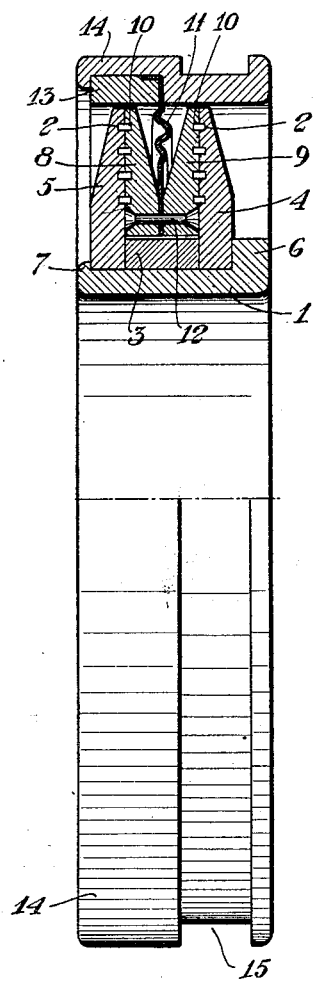
Inventor:
Sven Gustaf Wingquist
By Attorneys,
Fraser, Myers & Manley.

Patented Oct. 13, 1931

1,826,914

UNITED STATES PATENT OFFICE

SVEN GUSTAF WINGQUIST, OF GOTTENBORG, SWEDEN

PACKING DEVICE

Application filed January 24, 1924. Serial No. 688,247.

This invention relates to packing devices between relatively rotatable parts of hydraulic pumps or other machines which carry oil or other liquids under pressure. Said packing devices consist of two or more disks rigidly secured to one of said machine parts and of one or more floating disks interposed between said two first mentioned disks, said floating disks being flexibly connected to said other machine part and in a manner to form a fluid-tight connection therewith.

The object of the invention is to produce a packing device of the said type, which, even in case of a hydraulic pressure acting from but one side, will be substantially counterbalanced, i. e. in which the resulting axial pressure and, thus, also the friction between the surfaces bearing tightly against each other will be reduced to a minimum.

A further object of the invention is to provide a packing device in which the effect of centrifugal force is employed to oppose the leakage flow of liquid through the packing and to reduce the hydraulic pressure of said liquid upon a floating element of the packing. Further objects of the invention will appear in the following detailed description.

According to the present invention the disk or disks flexibly connected to the one machine part are designed in such manner as to form at one or both sides of the flexible connecting member a space provided with axially or substantially axially opposite pressure-sensitive surfaces having, preferably, the same or substantially the same size.

The flexible connecting member preferably consists of a corrugated sheet metal diaphragm, and one or more or all of the said disks may be provided with suitable packing means.

In the annexed drawing one form of embodiment of a packing device according to this invention is shown, partly in section.

On a sleeve 1, which may, for instance, be clamped to a shaft or the like or form part thereof, there are arranged two disks 4 and 5 having packing slots 2 and separated by means of a distance sleeve 3, said disks being pressed against the distance sleeve and also against a collar 6 of the sleeve 1 by beating down the sleeve 1 at 7. Interposed between the disks 4 and 5 there are two other floating disks 8 and 9, which may also have packing slots 10. The slots 2, 10 provide what is known in the art as a labyrinth packing. It is obvious that other forms of packing may be used. Interposed between the disks 8 and 9 is an annular plate or diaphragm 11 clamped at its inner circumference to the disks by means of rivets 12 or the like. The plate or diaphragm 11, which may be plane, but which is for the sake of better flexibility shown as corrugated in the drawing is clamped at its outer circumference into a sleeve 14 by means of a ring 13 and may, preferably, be bent over the disk 9 and the ring 13, respectively. In the drawing the clamping together of the members 1, 3, 4, 5 and 11, 13, 14, respectively is shown as performed by beating down the sleeves 1 and 14. However, the said clamping together may, obviously, also be performed by any other suitable means. Further, the sleeve 14 is provided with a packing slot 15. Obviously any suitable type of packing may be used between the machine elements and the sleeve 14 and also the sleeve 1, to effect a fluid tight seal therewith.

It will be obvious that the packing device illustrated is not intended to supply a bearing for the rotating parts nor to take care of axial thrusts on such parts, these functions being performed by any suitable means according to usual practice.

As apparent from the figure, the disks 8 and 9 are carried out and connected to the diaphragm 11 in such manner as to form between themselves and the diaphragm spaces confined between the interior surfaces of the disks 8 and 9 and the diaphragm. As apparent from the figure, the outer diameter of the disks 8 and 9 is nearly equal to the inner diameter of the sleeves 13, 14, carrying the diaphragm 11, and therefore the relatively opposed pressure-sensitive surfaces of the disks 8 or 9 and of the diaphragm 11 between which the said spaces are formed, will be substantially equal, the area of the diaphragm being only very slightly larger than the area of either of said disks. Consequently, if the device be exposed to a pressure say from the left hand side only, the resulting thrust tending to move the diaphragm and its associated rings 8 and 9 to the right will be very small due to the fact that the fluid pressure against disk 8 is acting to the left with a force almost counterbalancing or neutralizing the force of the fluid pressure on the diaphragm the active pressure surface of which, as before stated, is only slightly greater than that of said disk. As apparent from the figure, the connection between the annular disks 8, 9 and the diaphragm 11 is located near the inner circumference of the diaphragm and, thus, affords a comparatively flexible support for said disks, the diaphragm by this construction having a sufficiently large free area to permit it to yield readily to pressure.

If now a packing device according to the description be inserted, for instance between a shaft, to which the sleeve 1 is secured, and a housing, into which the sleeve 14 is secured, and if said device be exposed to a fluid pressure, for instance, from the left hand side, the mode of operation will be as follows:

Any liquid such as oil, if subjected to a moderate pressure, passes between the disks 8, 2 and the surrounding ring 13 and acts upon the diaphragm 11, and neutralizing disk 8, producing a certain resultant thrust which moves the diaphragm and its associated disks 8 and 9 towards the disk 4, the extent of this motion being so slight as to be impossible to illustrate in the figure. The actual displacement is of the order of from .001 to .002 m. m. This movement is sufficient, however, to effect a tight seal between the longitudinally fixed disk 4 and the floating disk 9. Simultaneously, a slight separation will occur between the disks 5 and 8, into which the liquid is able to penetrate, the pressure forming the seal between the disks 4 and 9 being thereby further increased because of the additional effective pressure area of the annular surface on the left hand face of disk 8 between its periphery and the annulus 3.

If now the shaft and the sleeve 1 be put in rotation, a considerable friction loss would occur, if the disk 9 were still pressed against the disk 4 with the augmented thrust due to the exposure of said annular additional effective pressure area on the left face of disk 8. However, this will not be the case, since, due to the rotation, the liquid contained between the disks 5 and 8 will be thrown outwards by centrifugal force, so that a partial vacuum will arise between the disks 8 and 5 which tends to draw them together. Thus the thrust between disks 9 and 4 will again be practically equalized and it will also be impossible for any considerable quantity of liquid to leak out between the disks 5 and 8, because centrifugal force prevents such action. Within a limited range of pressure, as determined by the specific gravity of the liquid and the speed of rotation of the disks, such centrifugal action will absolutely prevent any leakage whatever, and the packing device is therefore particularly well adapted to be used under conditions of moderate liquid pressures such as may be completely neutralized by the said centrifugal action, although the packing will operate satisfactorily under somewhat higher pressures.

It is obvious that slight displacements between the machine parts connected by the present device are allowable in an axial direction because of the flexibility of diaphragm 11, and displacements in radial direction are also possible, to the extent of the space between the sleeve 3 and the disks 8, 9. In spite of such relative displacements as must almost inevitably occur between relatively moving parts, the packing will remain practically fluid-tight.

As mentioned, the invention is not limited to the application of but two pairs of disks, more than two disks may, if desired, be secured to each of the machine parts.

What I claim as new and desire to secure by Letters Patent of the United States of America is:—

1. A packing device between internal and external relatively rotatable parts, said device comprising two axially stationary retaining disks secured to the internal part and a substantially rigid floating disk interposed between said axially stationary disks, the total separation between the cooperating faces of said floating and axially stationary disks being only sufficient to permit their free relative rotation, said floating disk having a circumferential annular chamber extending inward from the periphery thereof, and an annular flexible diaphragm lying within said chamber, the said diaphragm being tightly secured at its inner edge to the said floating disk and at its outer edge to the said external part, the adjacent surfaces of the diaphragm and a wall of said chamber subjected to the fluid pressure affording counterbalanced pressure-sensitive areas acting to substantially neutralize the effect of fluid pressure upon the exposed surface of said diaphragm.

2. The packing device according to claim 1, further characterized in that a plurality of labyrinth packing slots are provided in the cooperating faces of the said disks.

3. A packing device between internal and external relatively rotatable parts, said device comprising a floating disk, an annular diaphragm secured at its inner circumference against one face of said floating disk and secured at its periphery to said external part, an axially stationary disk mounted on said internal part adjacent to but slightly separated from the side of said floating disk opposite the diaphragm, and retaining means adapted to prevent said floating disk from being moved by the fluid pressure farther away from said stationary disk than the clearance thereby provided, whereby the centrifugal force acting on the fluid between said disks reduces the axial pressure on said disk, and the effect of fluid pressure acting on the opposite side of said floating disk is substantially neutralized by the pressure acting against the diaphragm attached thereto.

4. The packing device according to claim 3, further characterized in that the diameter of the said floating disk is substantially equal to the external diameter of said diaphragm.

In testimony whereof I affix my signature.

SVEN GUSTAF WINGQUIST.

CERTIFICATE OF CORRECTION.

Patent No. 1,826,914.             Granted October 13, 1931, to

SVEN GUSTAF WINGQUIST.

It is hereby certified that error appears in the above numbered patent requiring correction as follows: In the heading to the printed specification, line 4, application clause after "Serial No. 688,247" insert and in Sweden February 28, 1923, Application No. 627/23.; and that the said Letters Patent should be read with this correction therein that the same may conform to the record of the case in the Patent Office.

Signed and sealed this 8th day of December, A. D. 1931.

M. J. Moore,
Acting Commissioner of Patents.

(Seal)